(12) United States Patent
Lan et al.

(10) Patent No.: US 9,170,613 B2
(45) Date of Patent: Oct. 27, 2015

(54) CONNECTING ASSEMBLY AND ELECTRONIC DEVICE HAVING THE SAME

(71) Applicants: Wei-Hao Lan, Taipei (TW); Kun-Hsin Liu, Taipei (TW); Yao-Tsung Yeh, Taipei (TW); Hong-Tien Wang, Taipei (TW); Jui-Che Hsu, Taipei (TW); Shih-Chin Chou, Taipei (TW)

(72) Inventors: Wei-Hao Lan, Taipei (TW); Kun-Hsin Liu, Taipei (TW); Yao-Tsung Yeh, Taipei (TW); Hong-Tien Wang, Taipei (TW); Jui-Che Hsu, Taipei (TW); Shih-Chin Chou, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 109 days.

(21) Appl. No.: 14/166,867

(22) Filed: Jan. 29, 2014

(65) Prior Publication Data
US 2014/0328014 A1 Nov. 6, 2014

Related U.S. Application Data

(60) Provisional application No. 61/818,903, filed on May 2, 2013.

(51) Int. Cl.
*G06F 1/16* (2006.01)

(52) U.S. Cl.
CPC ............ *G06F 1/1681* (2013.01); *G06F 1/1637* (2013.01); *E05Y 2900/606* (2013.01); *Y10T 16/528* (2015.01)

(58) Field of Classification Search
CPC combination set(s) only.
See application file for complete search history.

(56) References Cited

U.S. PATENT DOCUMENTS

| | | | | |
|---|---|---|---|---|
| 6,778,382 B2* | 8/2004 | Yim | | 361/679.21 |
| 8,300,389 B2* | 10/2012 | Kang et al. | | 361/679.01 |
| 8,644,018 B2* | 2/2014 | Hung | | 361/679.41 |
| 8,817,457 B1* | 8/2014 | Colby et al. | | 361/679.29 |
| 8,840,200 B2* | 9/2014 | Chen | | 312/223.2 |
| 8,934,232 B2* | 1/2015 | Hsu et al. | | 361/679.27 |
| 9,072,174 B2* | 6/2015 | Lin et al. | | 1/1 |
| 2006/0002062 A1* | 1/2006 | Kwon et al. | | 361/680 |
| 2008/0024966 A1* | 1/2008 | Huang et al. | | 361/682 |
| 2010/0238620 A1* | 9/2010 | Fish | | 361/679.09 |
| 2013/0031750 A1* | 2/2013 | Lin et al. | | 16/382 |
| 2013/0155583 A1* | 6/2013 | Yang et al. | | 361/679.01 |
| 2014/0111915 A1* | 4/2014 | Tseng et al. | | 361/679.01 |
| 2014/0126126 A1* | 5/2014 | Chuang et al. | | 361/679.01 |
| 2014/0177162 A1* | 6/2014 | Ho et al. | | 361/679.43 |
| 2014/0211380 A1* | 7/2014 | Tsai | | 361/679.01 |
| 2014/0313655 A1* | 10/2014 | Chen | | 361/679.06 |
| 2014/0313665 A1* | 10/2014 | Delpier et al. | | 361/679.55 |
| 2015/0098182 A1* | 4/2015 | Liu et al. | | 361/679.55 |

FOREIGN PATENT DOCUMENTS

| TW | I292521 | 1/2008 |
|---|---|---|
| TW | M430792 | 6/2012 |

* cited by examiner

*Primary Examiner* — Lisa Lea Edmonds
(74) *Attorney, Agent, or Firm* — Jianq Chyun IP Office

(57) ABSTRACT

A connecting assembly between first and second bodies of an electronic device is provided. The connecting assembly includes a guiding member fixed to the second body and pivoted on a side of the first body along an axis, a guiding portion, an engaging member fixed to the first body, an engaging portion fixed to the second body, and a restoring member between the guiding member and the first body. When the second body is assembled to the first body, engagement between the guiding member and the guiding portion allows the guiding member to rotate relative to the first body along the axis from a first to a second position. The restoring member restores the position of the guiding member to the first position relative to the first body to establish engagement between the engaging member and the engaging portion. An electronic device having the connecting assembly is also provided.

14 Claims, 7 Drawing Sheets

CONNECTING ASSEMBLY AND ELECTRONIC DEVICE HAVING THE SAME

CROSS-REFERENCE TO RELATED APPLICATION

This application claims the priority benefits of U.S. provisional application Ser. No. 61/818,903, filed on May 2, 2013. The entirety of the above-mentioned patent applications is hereby incorporated by reference herein and made a part of this specification.

BACKGROUND OF THE INVENTION

1. Field of the Invention

The invention relates to a connecting assembly and an electronic device having the connecting assembly; more particularly, the invention relates to a connecting assembly adapted for a detachable electronic device and a detachable electronic device having the connecting assembly.

2. Description of Related Art

In the information era, touch modules have been acting as the input components of various electronic devices, and touch display devices (e.g., tablet PCs) capable of performing both the touch function and the display function have gained popularity in recent years. However, in order to satisfy the requirements for compactness and light weight, functions and expandability of the tablet PCs are slightly insufficient as compared to the desktop computers or the notebook computers that require relatively large operational space.

In view of the above, a docking station has been proposed according to the related art, and the tablet PC may be assembled to the conventional docking station to expand its functions (e.g., performing a function of a standard keyboard). Said tablet PC and said docking station are often assembled together by means of a connecting assembly, and thus how to easily and rapidly assemble the tablet PC to the docking station or disassemble the tablet PC from the docking station is crucial to the design of the connecting assembly.

SUMMARY OF THE INVENTION

The invention is directed to a connecting assembly; when the connecting assembly is applied in an electronic device having two bodies, one of the two bodies may be easily and rapidly assembled to or disassembled from the other.

The invention is also directed to an electronic device having said connecting assembly, such that one of two bodies of the electronic device may be easily and rapidly assembled to or disassembled from the other.

In an embodiment of the invention, a connecting assembly adapted for an electronic device is provided. The electronic device includes a first body and a second body, and the connecting assembly is located between the second body and the first body, such that the second body is detachably assembled to the first body. The connecting assembly includes a guiding member, a guiding portion, an engaging member, an engaging portion, and a restoring member. The guiding member is pivoted on a side of the first body along an axis, and the guiding portion is fixed to the second body and configured to be engaged with the guiding member. The engaging member is fixed to the first body, and the engaging portion is fixed to the second body and configured to be engaged with the engaging member. The restoring member is located between the guiding member and the first body and configured to restore a position of the guiding member relative to the first body along the axis.

When the second body is assembled to the first body, engagement between the guiding member and the guiding portion allows the guiding member to rotate relative to the first body along the axis from a first position to a second position, and the restoring member restores the position of the guiding member to be at the first position relative to the first body, so as to establish engagement between the engaging member and the engaging portion. When the second body is disassembled from the first body, the second body exerts a force to the guiding portion to rotate the guiding member relative to the first body along the axis from the first position to the second position and release the engagement between the engaging portion and the engaging member, and the force exerted by the second body further moves the guiding portion away from the guiding member, such that the second body is separated from the first body.

In an embodiment of the invention, an electronic device that includes a first body, a second body, and a connecting assembly is provided. The connecting assembly is located between the first body and the second body, such that the second body is detachably assembled to the first body. The connecting assembly includes a guiding member, a guiding portion, an engaging member, an engaging portion, and a restoring member. The guiding member is pivoted on a side of the first body along an axis, and the guiding portion is fixed to the second body and configured to be engaged with the guiding member. The engaging member is fixed to the first body, and the engaging portion is fixed to the second body and configured to be engaged with the engaging member. The restoring member is located between the guiding member and the first body and configured to restore a position of the guiding member relative to the first body along the axis.

When the second body is assembled to the first body, engagement between the guiding member and the guiding portion allows the guiding member to rotate relative to the first body along the axis from a first position to a second position, and the restoring member restores the position of the guiding member to be at the first position relative to the first body, so as to establish engagement between the engaging member and the engaging portion. When the second body is disassembled from the first body, the second body exerts a force to the guiding portion to rotate the guiding member relative to the first body along the axis from the first position to the second position and release the engagement between the engaging portion and the engaging member, and the force exerted by the second body further moves the guiding portion away from the guiding member, such that the second body is separated from the first body.

In light of the foregoing, the second body and the first body of the electronic device are engaged with and assembled to each other by rotating the connecting assembly, and thus the two bodies may be assembled to or disassembled from each other in a fast and easy manner. Besides, the restoring member of the connecting assembly may automatically restore the position of the guiding member after the rotation of the guiding member, and thereby it is rather convenient for a user to operate the electronic device.

In order to make the aforementioned and other features and advantages of the invention comprehensible, embodiments accompanied with figures are described in detail below.

DETAILED DESCRIPTION OF DISCLOSED EMBODIMENTS

Figure 1A:
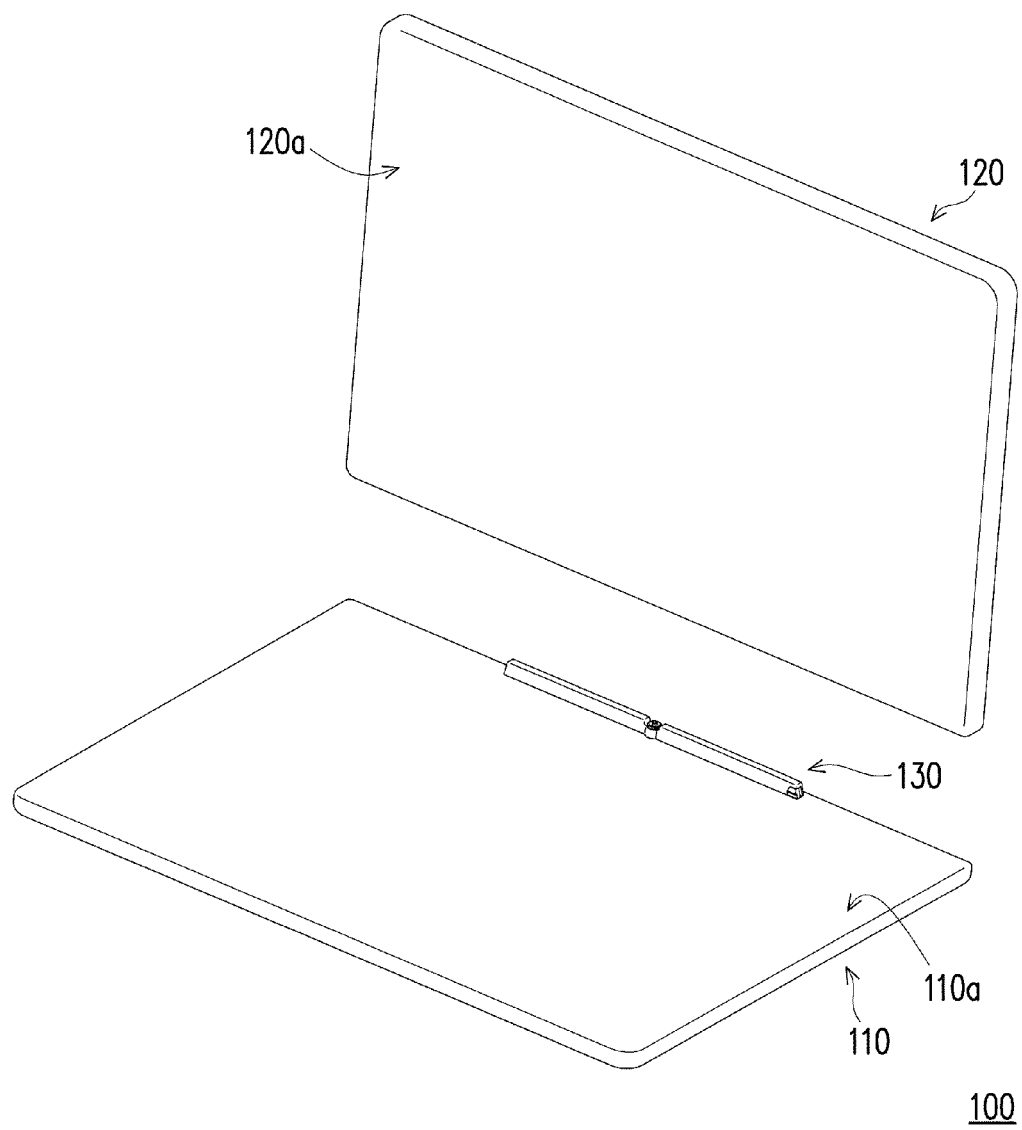
FIG. 1A is a schematic diagram illustrating an electronic device according to an embodiment of the invention.

FIG. 1A is a schematic diagram illustrating an electronic device according to an embodiment of the invention. According to the present embodiment, the electronic device 100 includes a first body 110, a second body 120, and a connecting assembly 130. The connecting assembly 130 is located between the first body 110 and the second body 120, such that the second body 120 is detachably assembled to the first body 110. In FIG. 1, the second body 120 is not assembled to the first body 110 yet. In the present embodiment, the first body 110 is a docking station, and the second body 120 is a tablet PC, for instance. Here, the first body 110 has an input surface 110a (e.g., an input surface of a standard keyboard), and the second body 120 has a display surface 120a (e.g., a display surface of a flat panel display). After the second body 120 is assembled to the first body 110, a user is able to observe the images on the display surface 120a of the second body 120 and operate the electronic device 100 mainly by means of the input surface 110a of the first body 110.

Figure 1B:
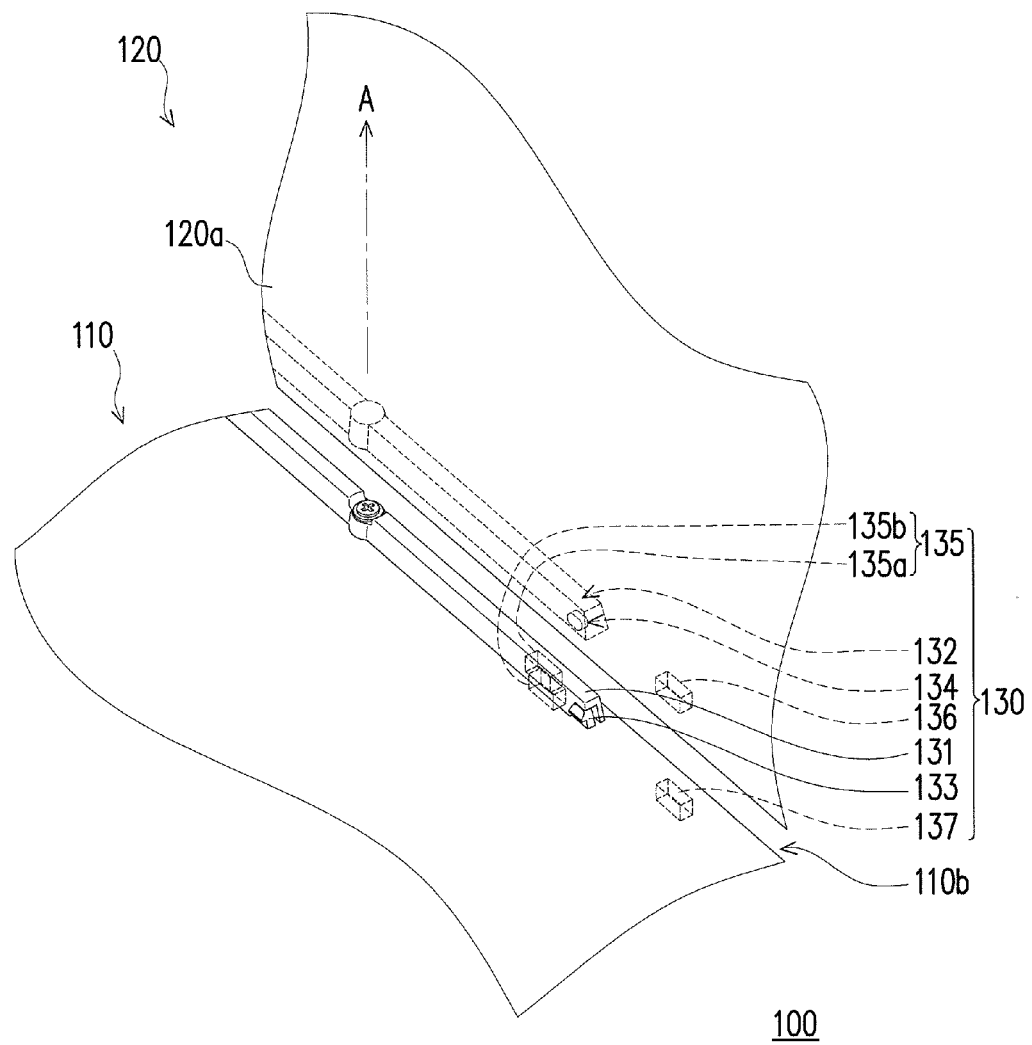
FIG. 1B is a schematic partial enlarged view of FIG. 1A.
Figure 1C:
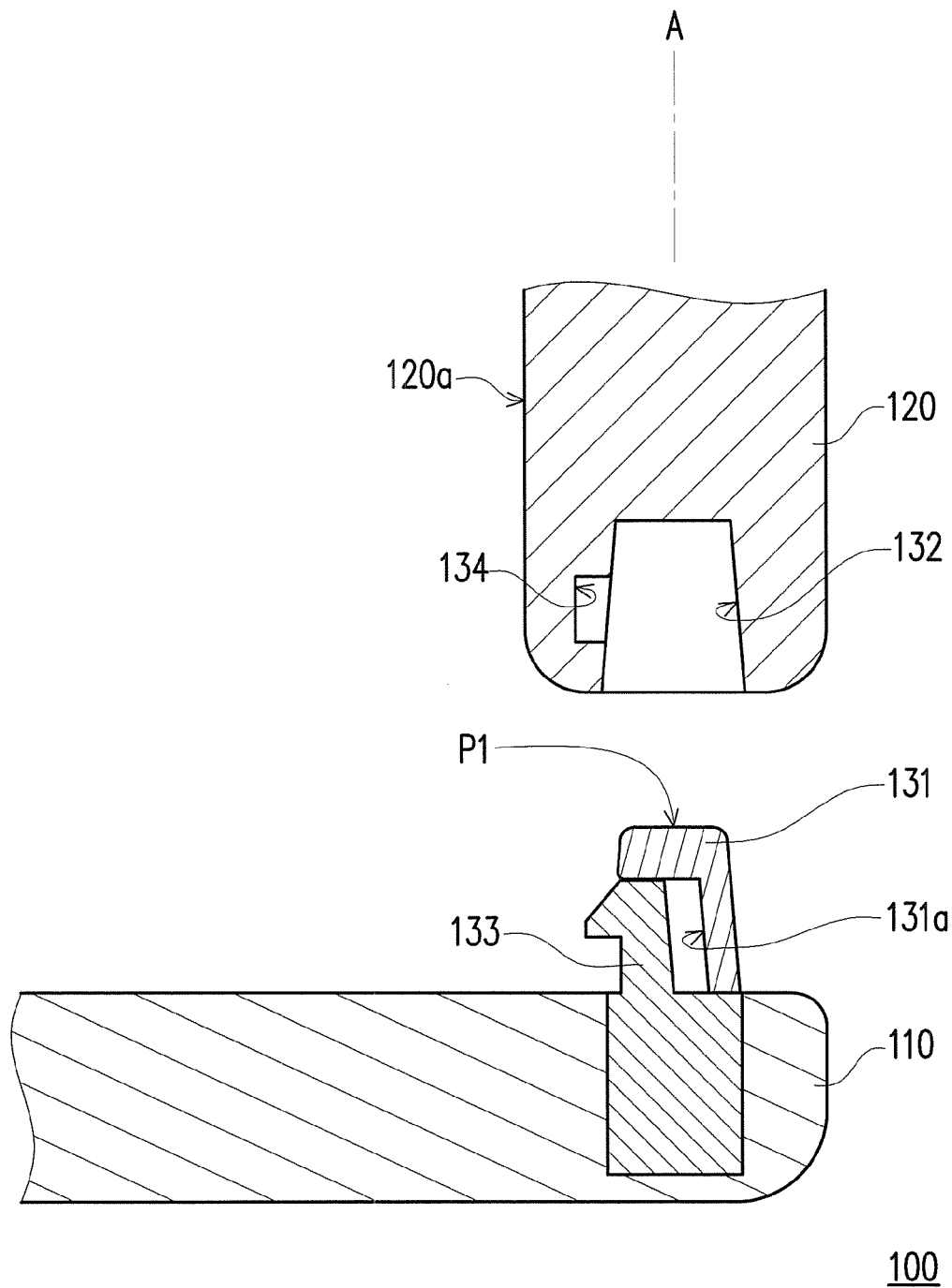
FIG. 1C is a schematic cross-sectional view of FIG. 1A.

FIG. 1B is a schematic partial enlarged view of FIG. 1A. FIG. 1C is a schematic cross-sectional view of FIG. 1A. With reference to FIG. 1B and FIG. 1C, the connecting assembly 130 includes a guiding member 131, a guiding portion 132, an engaging member 133, an engaging portion 134, and a restoring member 135. The guiding member 131 is pivoted on a side 110b of the first body 110 along an axis A, and the axis A is parallel to the display surface 120a. The guiding portion 132 is fixed to the second body 120 and configured to be engaged with the guiding member 131. The engaging member 133 is fixed to the first body 110, and the engaging portion 134 is fixed to the second body 120 and configured to be engaged with the engaging member 133. The restoring member 135 is located between the guiding member 131 and the first body 10 and configured to restore a position of the guiding member 131 relative to the first body 110 along the axis A.

In the present embodiment, the guiding portion 132 is a guiding groove and is recessed into the second body 120, and the engaging portion 134 is located in the guiding groove. Besides, the engaging member 133 is a locking hook, the engaging portion 134 is a groove, and the locking hook may be locked to the groove. In the present embodiment, the guiding member 131 is a guiding rail and has an accommodation space 131a, and the engaging member 133 is next to the guiding member 131. When the second body 120 is not assembled to the first body 110 yet, as shown in FIG. 1C, the engaging member 133 is away from the accommodation space 131a, i.e., the engaging member 133 protrudes from the guiding member 131.

The restoring member 135 includes a first magnetic member 135a and a second magnetic member 135b. The first magnetic member 135a is fixed to the guiding member 131, and the second magnetic member 135b is fixed to the first body 110. A magnetic force between the first magnetic member 135a and the second magnetic member 135b may restore the position of the guiding member 131 relative to the first body 110. The connecting assembly 130 further includes a third magnetic member 136 and a fourth magnetic member 137. The third magnetic member 136 is fixed to the second body 120, and the fourth magnetic member 137 is fixed to the first body 110. A magnetic force between the third magnetic member 136 and the fourth magnetic member 137 fixes the second body 120 to the first body 110. According to the present embodiment, the first magnetic member 135a, the second magnetic member 135b, the third magnetic member 136, and the fourth magnetic member 137 may be magnets, for instance.

Figure 2A:
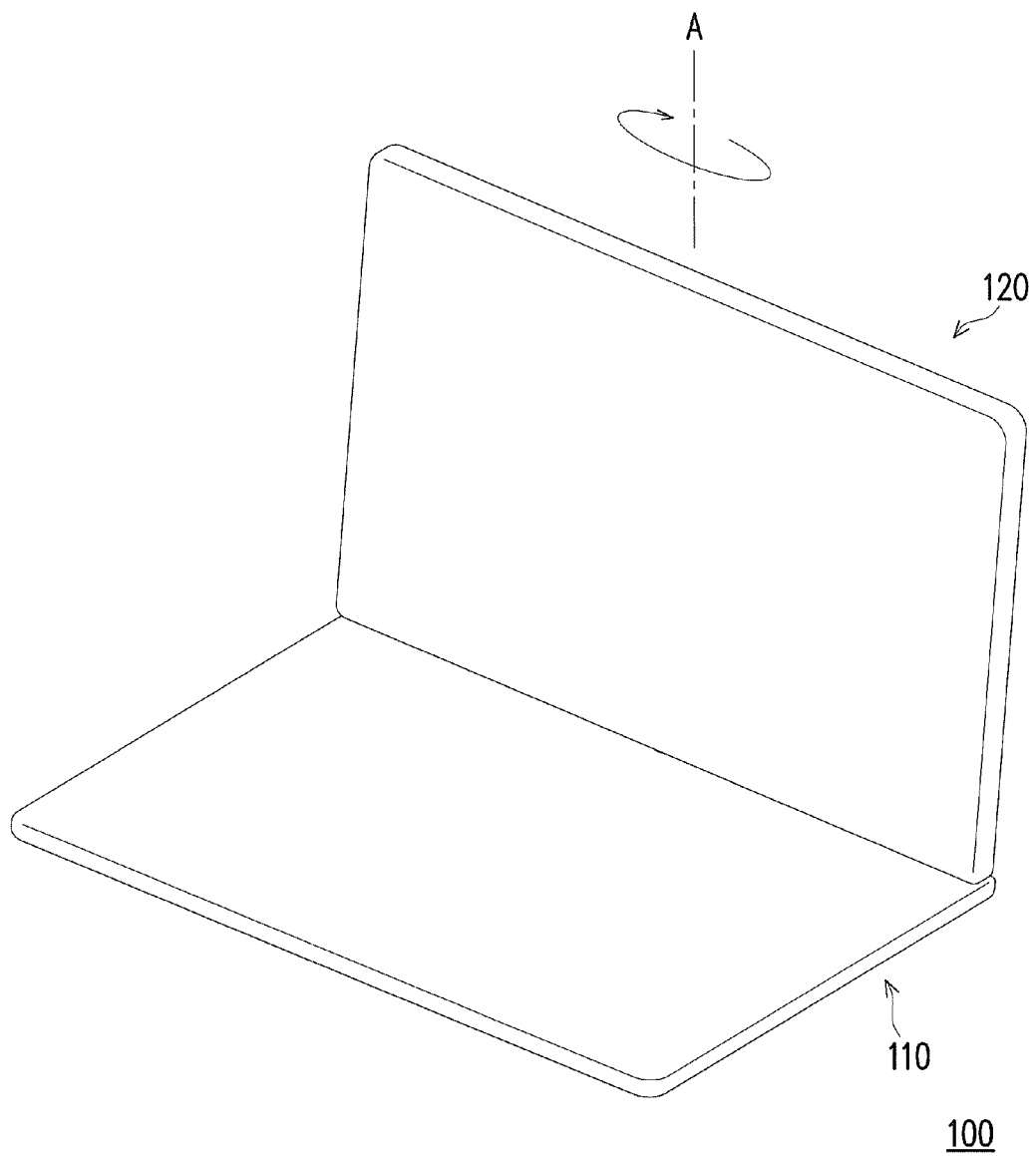
FIG. 2A illustrates that the connecting assembly depicted in FIG. 1A rotates relative to the first body to the second position.
Figure 2B:
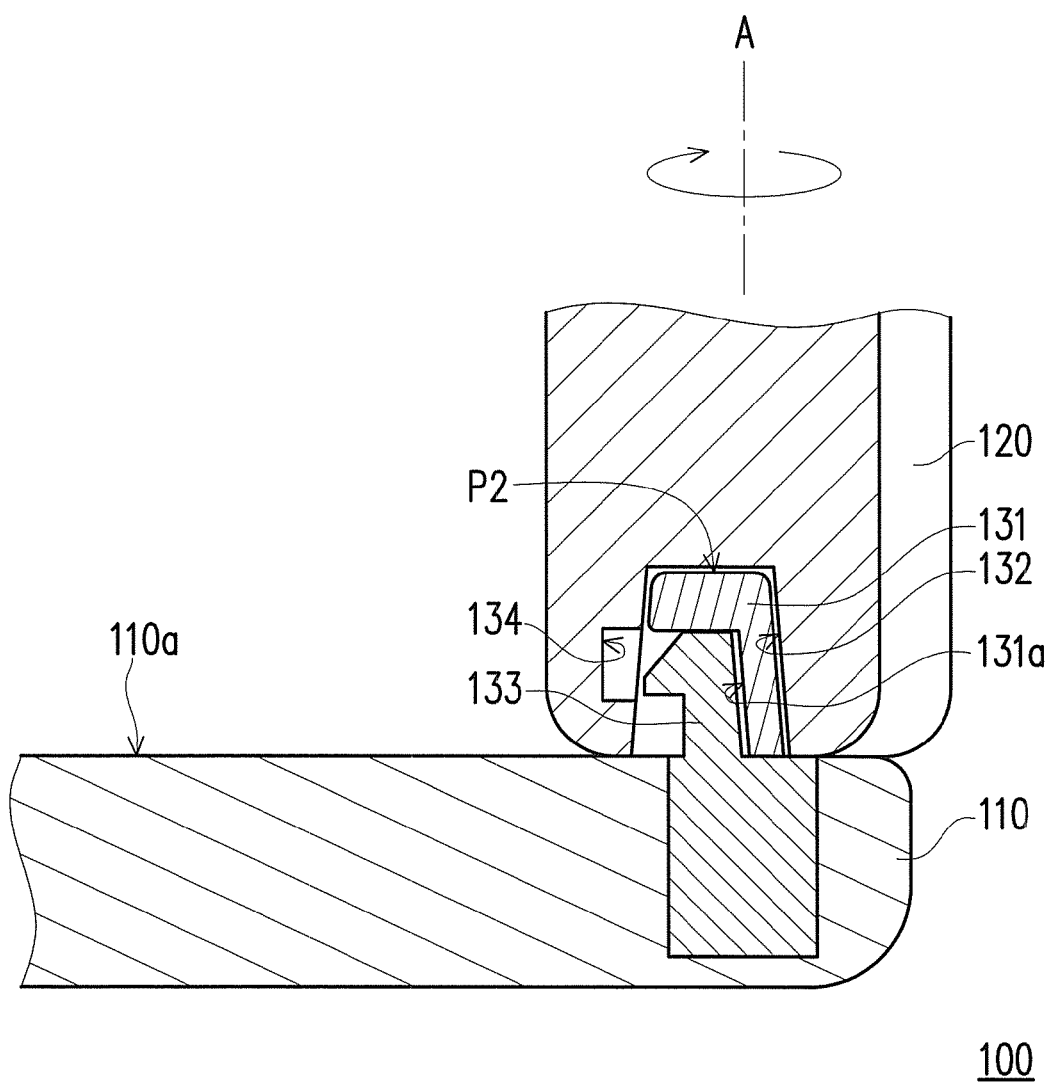
FIG. 2B is a schematic cross-sectional view of FIG. 2A.

FIG. 2A illustrates that the connecting assembly depicted in FIG. 1A rotates relative to the first body to the second position. FIG. 2B is a schematic cross-sectional view of FIG. 2A. With reference to FIG. 2A and FIG. 2B, when the second body 120 is assembled to the first body 110, the guiding portion 132 approaches the guiding member 131, such that the guiding member 131 is engaged with the guiding portion 132. The engagement between the guiding member 131 and the guiding portion 132 allows the guiding member 131 to rotate relative to the first body 110 along the axis A from a first position P1 shown in FIG. 1C to a second position P2. The rotation of the guiding member 131 allows the guiding member 131 to approach the engaging member 133 and further move the engaging member 133 into the accommodation space 131a. The second body 120 then approaches the input surface 110a of the first body 110 and completely leans on the first body 110. Thereby, the guiding member 131 is completely engaged with the guiding portion 132, and the engaging member 133 is located in the guiding portion 132.

Figure 3A:
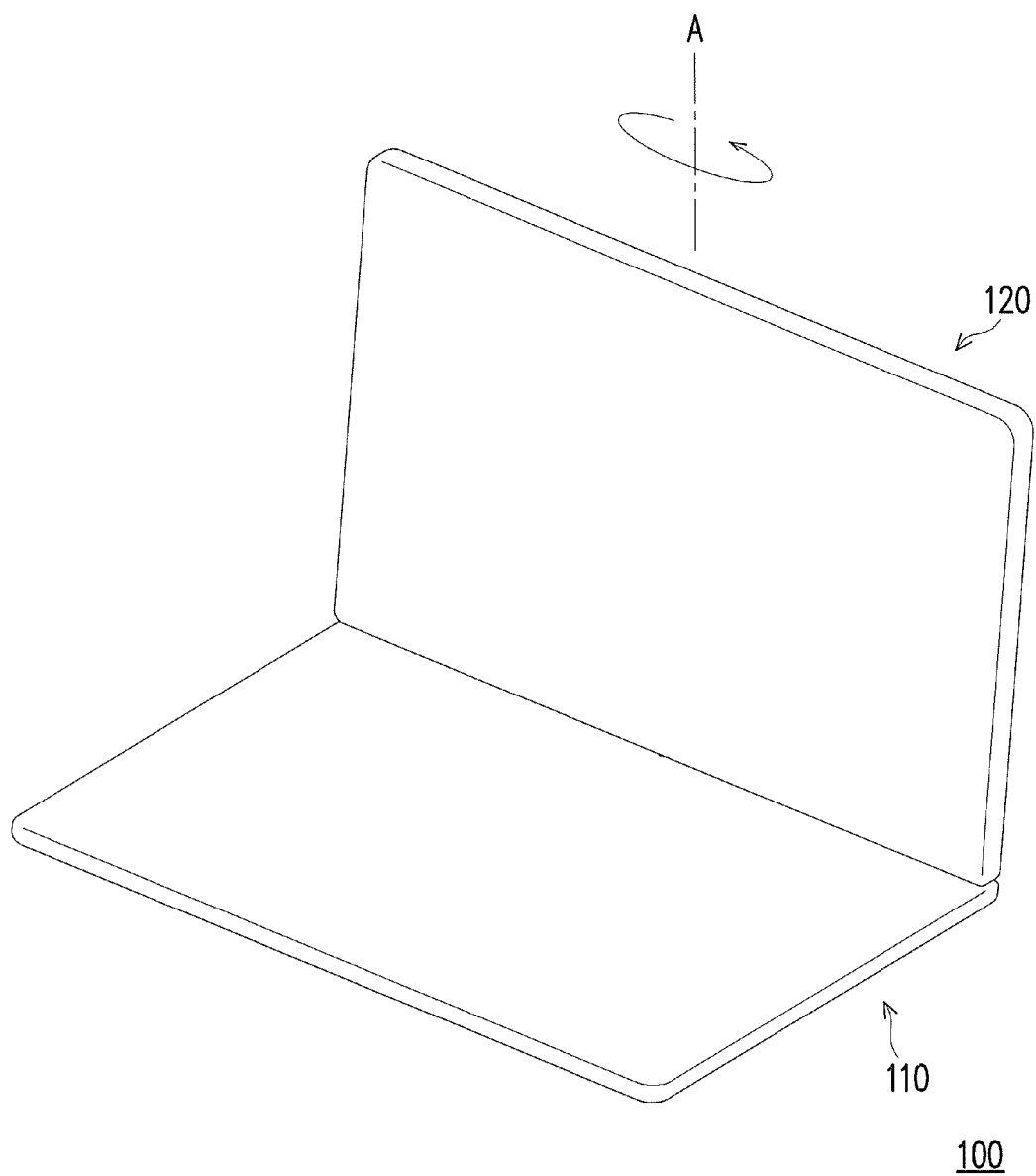
FIG. 3A illustrates that the position of the connecting assembly depicted in FIG. 2A is restored to be at the first position relative to the first body.
Figure 3B:
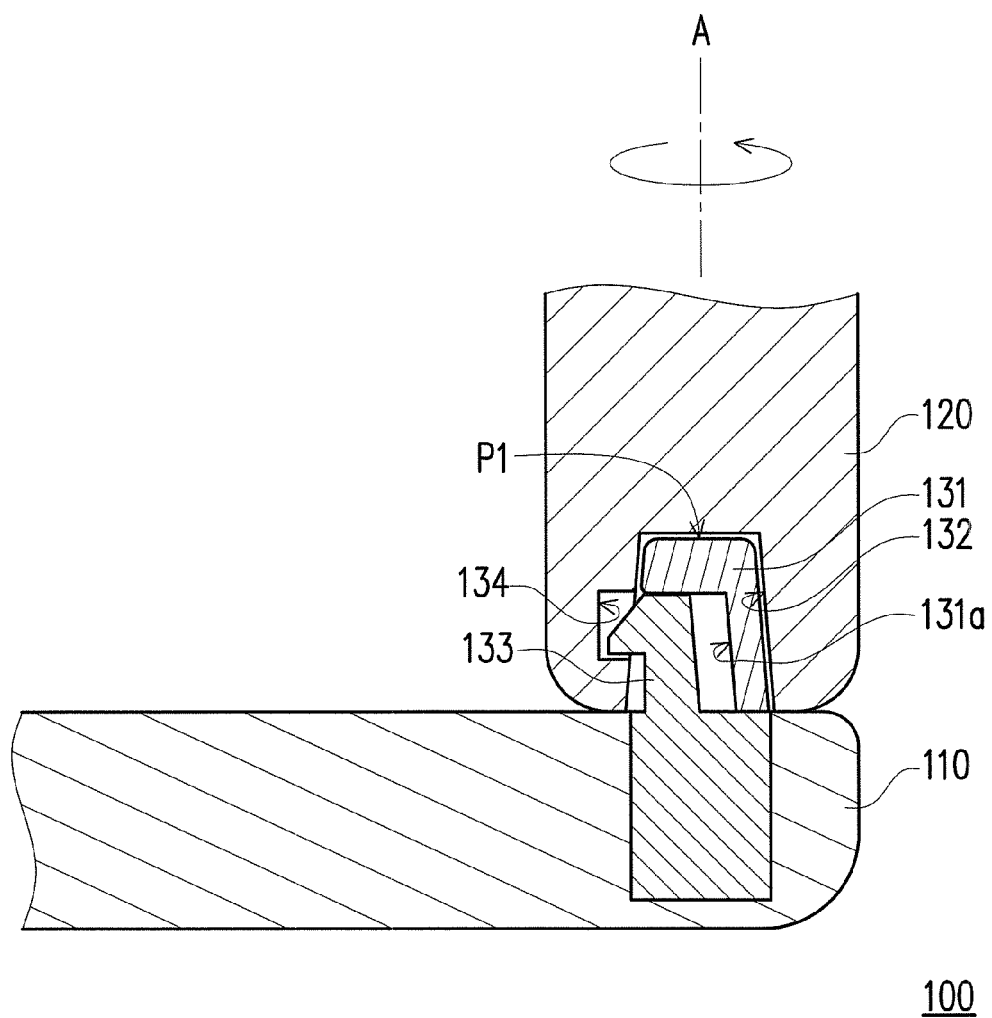
FIG. 3B is a schematic cross-sectional view of FIG. 3A.

FIG. 3A illustrates that the position of the connecting assembly 130 depicted in FIG. 2A is restored to be at the first position relative to the first body 110. FIG. 3B is a schematic cross-sectional view of FIG. 3A. With reference to FIG. 3A and FIG. 3B, the magnetic force between the first magnetic member 135a and the second magnetic member 135b restores the position of the guiding member 131 relative to the first body 110 along the axis A, such that the guiding member 131 is reversely rotated relative to the first body 110 to the first position P1. At this time, the engaging member 133 moves away from the accommodation space 131a and is engaged with the engaging portion 134. Besides, the magnetic force between the third magnetic member 136 and the fourth magnetic member 137 (shown in FIG. 1B) stably fixes the second body 120 to the first body 110. Thereby, the second body 120 is completely assembled to the first body 110.

When the user intends to disassemble the second body 120 from the first body 110, the user may reverse said assembly process. Specifically, when the second body 120 is disassembled from the first body 110, the user may exert a force on the second body 120, and the second body 120 then exerts a force to the guiding portion 132 to rotate the guiding member 131 relative to the first body 110 along the axis A from the first position P1 shown in FIG. 3B to the second position P2 shown in FIG. 2B. As illustrated in FIG. 2B, at this time, the engaging member 133 moves into the accommodation space 131a, and the engagement of the engaging member 133 and the engaging portion 134 is released.

The second body 120 is then separated from the first body 110, and thereby the relative positions of the second and first bodies 120 and 110 are shown in FIG. 1C. After the second body 120 is disassembled from the first body 110, the magnetic force between the first magnetic member 135a and the second magnetic member 135b may restore the position of the guiding member 131 to be at the first position P1 shown in FIG. 1C relative to the first body 110. Note that the magnetic force serves as the restoring force that allows the position of the guiding member 131 to be restored in the present embodiment; however, an elastic force may also serve as the restoring force in other embodiments that are not shown in the drawings. Particularly, in another embodiment of the invention, the restoring member is an elastic member, e.g., a spring. After the second body 120 is disassembled from the first body 110, the elastic force of the elastic member restores the position of the guiding member 131 to be at the first position P1 relative to the first body 110.

To sum up, in an embodiment of the invention, the second body and the first body of the electronic device are engaged with and assembled to each other by rotating the connecting assembly, and thus the two bodies may be assembled to or disassembled from each other in a fast and easy manner. Moreover, the restoring member of the connecting assembly may automatically restore the position of the guiding member after the rotation of the guiding member, and thereby it is rather convenient for a user to operate the electronic device.

It will be apparent to those skilled in the art that various modifications and variations can be made to the structure of the disclosed embodiments without departing from the scope or spirit of the invention. In view of the foregoing, it is intended that the invention cover modifications and variations of this invention provided they fall within the scope of the following claims and their equivalents.

What is claimed is:

1. An electronic device comprising: a first body; a second body; and a connecting assembly located between the first body and the second body, such that the second body is detachably assembled to the first body, the connecting assembly comprising: a guiding member pivoted on a side of the first body along an axis; a guiding portion fixed to the second body and configured to be engaged with the guiding member; an engaging member fixed to the first body; an engaging portion fixed to the second body and configured to be engaged with the engaging member; and a restoring member located between the guiding member and the first body and configured to restore a position of the guiding member relative to the first body along the axis, wherein when the second body is assembled to the first body, engagement between the guiding member and the guiding portion allows the guiding member to rotate relative to the first body along the axis from a first position to a second position, and the restoring member restores the position of the guiding member to be at the first position relative to the first body, so as to establish engagement between the engaging member and the engaging portion; when the second body is disassembled from the first body, the second body exerts a force to the guiding portion to rotate the guiding member relative to the first body along the axis from the first position to the second position and release the engagement between the engaging portion and the engaging member, and the force exerted by the second body further moves the guiding portion away from the guiding member, such that the second body is separated from the first body.

2. The electronic device as recited in claim 1, wherein the restoring member is an elastic member, and after the second body is disassembled from the first body, an elastic force of the elastic member restores the position of the guiding member to be at the first position relative to the first body.

3. The electronic device as recited in claim 1, wherein the restoring member comprises:
   a first magnetic member fixed to the guiding member; and
   a second magnetic member fixed to the first body, wherein after the second body is disassembled from the first body, a magnetic force between the first magnetic member and the second magnetic member restores the position of the guiding member to be at the first position relative to the first body.

4. The electronic device as recited in claim 1, wherein the connecting assembly further comprises:
   a third magnetic member fixed to the second body; and
   a fourth magnetic member fixed to the first body, wherein when the second body is assembled to the first body, a magnetic force between the third magnetic member and the fourth magnetic member fixes the second body to the first body.

5. The electronic device as recited in claim 1, wherein the guiding portion is a guiding groove, the guiding member is a guiding rail, the engaging portion is located in the guiding groove, and when the second body is assembled to the first body, the guiding rail is engaged with the guiding groove.

6. The electronic device as recited in claim 5, wherein the guiding rail has an accommodation space, when the second body is assembled to the first body, the engaging member moves away from the accommodation space and is engaged with the engaging portion, and when the second body is disassembled from the first body, the engaging member moves into the accommodation space, such that the engagement of the engaging member and the engaging portion is released.

7. The electronic device as recited in claim 1, wherein the second body has a display surface, and the axis is parallel to the display surface.

8. A connecting assembly adapted for an electronic device, the electronic device comprising a first body and a second body, the connecting assembly being located between the second body and the first body, such that the second body is detachably assembled to the first body, the connecting assembly comprising:
   a guiding member pivoted on a side of the first body along an axis;
   a guiding portion fixed to the second body and configured to be engaged with the guiding member;
   an engaging member fixed to the first body;
   an engaging portion fixed to the second body and configured to be engaged with the engaging member; and
   a restoring member located between the guiding member and the first body and configured to restore a position of the guiding member relative to the first body along the axis,
   wherein when the second body is assembled to the first body, engagement between the guiding member and the guiding portion allows the guiding member to rotate relative to the first body along the axis from a first position to a second position, and the restoring member restores the position of the guiding member to be at the first position relative to the first body, so as to establish engagement between the engaging member and the engaging portion; when the second body is disassembled from the first body, the second body exerts a force to the guiding portion to rotate the guiding member relative to the first body along the axis from the first position to the second position and release the engagement between the engaging portion and the engaging member, and the force exerted by the second body further moves the guiding portion away from the guiding member, such that the second body is separated from the first body.

9. The connecting assembly as recited in claim 8, wherein the restoring member is an elastic member, and after the second body is disassembled from the first body, an elastic force of the elastic member restores the position of the guiding member to be at the first position relative to the first body.

10. The connecting assembly as recited in claim 8, wherein the restoring member comprises:
- a first magnetic member fixed to the guiding member; and
- a second magnetic member fixed to the first body, wherein after the second body is disassembled from the first body, a magnetic force between the first magnetic member and the second magnetic member restores the position of the guiding member to be at the first position relative to the first body.

11. The connecting assembly as recited in claim 8, further comprising:
- a third magnetic member fixed to the second body; and
- a fourth magnetic member fixed to the first body, wherein when the second body is assembled to the first body, a magnetic force between the third magnetic member and the fourth magnetic member fixes the second body to the first body.

12. The connecting assembly as recited in claim 8, wherein the guiding portion is a guiding groove, the guiding member is a guiding rail, the engaging portion is located in the guiding groove, and when the second body is assembled to the first body, the guiding rail is engaged with the guiding groove.

13. The connecting assembly as recited in claim 12, wherein the guiding rail has an accommodation space, when the second body is assembled to the first body, the engaging member moves away from the accommodation space and is engaged with the engaging portion, and when the second body is disassembled from the first body, the engaging member moves into the accommodation space, such that the engagement of the engaging member and the engaging portion is released.

14. The connecting assembly as recited in claim 8, wherein the second body has a display surface, and the axis is parallel to the display surface.

\* \* \* \* \*